United States Patent [19]

Nault

[11] 4,039,206

[45] Aug. 2, 1977

[54] ATTACHMENT FOR GROUND-ENGAGING PADS OF STABILIZERS

[76] Inventor: Harold Nault, 48 Beau St., Norwalk, Conn. 06880

[21] Appl. No.: 639,367

[22] Filed: Dec. 10, 1975

Related U.S. Application Data

[63] Continuation-in-part of Ser. No. 553,328, Feb. 26, 1975, Pat. No. 3,976,306.

[51] Int. Cl.$^2$ ........ B60S 9/00

[52] U.S. Cl. ........ 280/763; 214/138 R; 212/145

[58] Field of Search ........ 212/145; 214/130 R, 214/141, 138 R; 280/763-766; 248/188, 188.8, 188.9, 154, 119 R

[56] References Cited

U.S. PATENT DOCUMENTS

| | | | |
|---|---|---|---|
| 2,358,865 | 9/1944 | McPherson | 248/188.9 |
| 3,534,877 | 10/1970 | Menzi | 212/145 |
| 3,697,096 | 10/1972 | Hadley | 248/188 |
| 3,721,458 | 3/1973 | Mitchell | 280/764 |
| 3,913,942 | 10/1975 | Mackenzie et al. | 280/764 |

*Primary Examiner*—Albert J. Makay
*Assistant Examiner*—R. B. Johnson

[57] ABSTRACT

An attachment for ground-engaging pads of stabilizer arms of material-handling apparatus. The pad has a ground-engaging plate and at least one bracket normal with respect to the ground-engaging plate which is welded or otherwise rigidly secured thereto. The bracket (or a pair of brackets) is pivotally connected to the free end of the stabilizer arm in a conventional manner. The ground-engaging plate has at least one slit. A smooth-terrain engaging attachment (preferably rubber-faced) is adapted to be mounted on the pad by having a portion projecting through said slit in the plate and having a bar, spaced from said slit and rigidly secured to the attachment which is adapted to be slid over the ground-engaging plate. A pin is removably mounted in the projecting portion of the attachment for holding the attachment in operating position on the pad, so that when the pin is removed, the attachment can be easily slid out of and dismounted from the ground-engaging pad.

2 Claims, 8 Drawing Figures

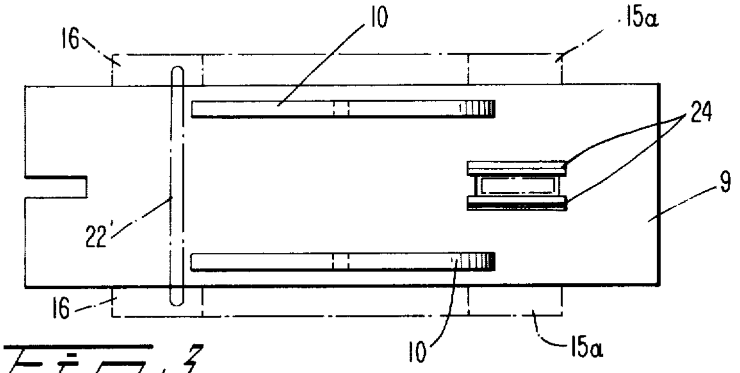
Fig. 3
Fig. 4
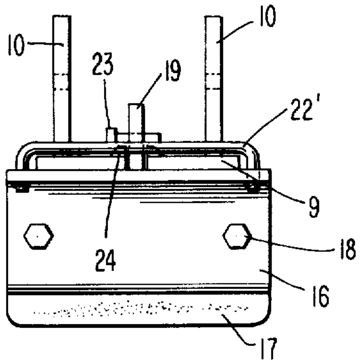
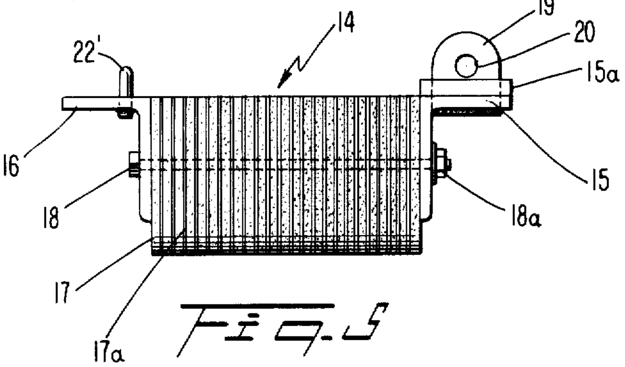
Fig. 5
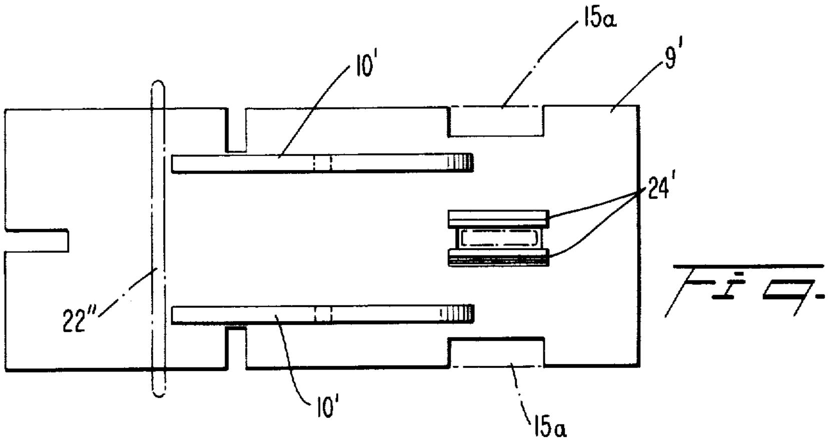
Fig. 6
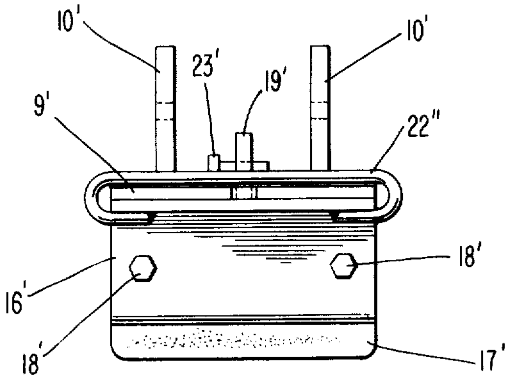
Fig. 7
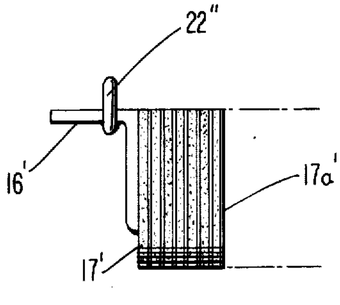
Fig. 8

ATTACHMENT FOR GROUND-ENGAGING PADS OF STABILIZERS

CROSS-REFERENCE TO RELATED APPLICATION

The present invention relates to attachments for pads of stabilizers such as disclosed and claimed in my copending application Ser. No. 553,328, filed Feb. 26, 1975, now U.S. Pat. No. 3,976,306 of which the instant application is a continuation-in-part thereof.

BACKGROUND OF THE INVENTION

The present invention relates to attachments for pads of stabilizers for vehicles and more particularly for attachments for stabilizer pads for mobile machinery such as vehicle-mounted backhoes, cranes, shovels or the like.

Conventionally, some types of material-handling apparatus are mounted on vehicle chassis to facilitate movement of material-handling equipment from one site of a work operation to the next. The vehicle on which the material-handling machine is mounted is usually in the form of a tractor, and the machine includes a mounting frame to which is pivoted a swing frame or boom which is also pivoted on a vertical axis for lateral swinging movement relative to the mounting frame of the vehicle. Material-handling or holding means such as buckets or other implements, are usually carried by the swing frame, or boom, for movement therewith.

Generally the wheel base of the ground-engaging wheels of the tractor does not provide sufficient stability for the machine, when the machine is in working position. This is particularly true in earth-moving machinery, such as shovels or backhoes, which are adapted to pick up a load in an extended position of the boom relative to the frame of the machinery and the vehicle, and to raise the load and carry the load to a place of disposal, likewise remote from the vehicle. This is accomplished by swinging movement of the swing frame or boom of the machine. Since the swinging frame or boom of the machinery is usually swingable along an arc subtending approximately 180°, the swinging frame, when loaded, tends to unbalance the vehicle, causing the vehicle and machine to be tipped ovr if no further stabilizing means are provided.

The conventional stabilizing means, particularly for backhoes or other earth-moving machinery, comprise stabilizing arms adapted to be extended from the vehicle or from the frame of the machine. These stabilizing arms are conventionally pivotally mounted about a horizontal axis as well as about a vertical axis and are thus swingable for both vertical and horizontal swinging movement. The stabilizer arms are provided at their free ends with pivotally movable ground-engaging pad members for supporting the stabilizer assembly upon a ground surface when the earth-moving machinery is in an operating position. The stabilizer pad member conventionally comprises a pair of integral or welded brackets which have a pair of holes for receiving a pivot pin. These stabilizer pad members are pivotally connected to the free ends of the stabilizer arms by means of the aforementioned pins. Such pad members have ground-engaging surfaces which generally is suitable for contacting only one particular type of ground surface or terrain. When the material-handling apparatus is moved from one construction site to another having a different type of terrain, it is usually necessary to exchange one type of pad member for another type of pad member adapted to properly engage the new type of terrain found at the new construction site. The major material-handling apparatus manufacturers thus sell a line of ground-engaging pad members which include generally at least five different types of pad members. Thus the operator of a material-handling apparatus, such as a backhoe, must purchase five different types of ground-engaging pad members for his material-handling machine in order to provide the necessary versatility to the machine to operate in all types of terrain. These various types of stabilizer pad members are not only costly but the dismounting and replacing of such stabilizer pad members from the stabilizer arms is quite time-consuming.

SUMMARY OF THE INVENTION

The present invention provides an attachment or utensil for ground-engaging pads of stabilizers of material-handling apparatus which can be easily mounted on the pad member, thereby changing the ground-engaging characteristics of the pad member and avoiding the necessity of exchanging pairs of ground-engaging pad members.

The attachment or utensil for ground-engaging pads of stabilizer arms of material-handling apparatus of the present invention comprise at least one portion adapted to project through an opening in the pad member and another portion which surrounds the plate of the pad member and is thus suspended therefrom. The projecting portion of the attachment has a bore through which a retaining pin may be inserted. The retaining pin bears against the upper surface of the pad member and thereby maintains the ground-engaging attachment in position on the pad member.

Thus, for example, a pad member adapted to engage and contact a rough terrain, such as the attachment or utensil disclosed in my copending application Ser. No. 553,328, filed Feb. 26, 1975, can be easily transformed into a smooth-terrain-engaging pad member by mounting the attachment or utensil of the present invention on the pad member, which is already mounted on the stabilizer arms of the material-handling apparatus. Thus the pad members mounted on the stabilizer arms do not need to be dismounted when the material-handling apparatus is moved from a construction site having a rough terrain to another construction site having a smooth terrain or vice-versa. The existing pad members can be easily converted for purposes of receiving the ground-engaging attachment or utensil of the present invention by sliding one end of the attachment over one end of the plate of the existing pad member and inserting the projecting portion of the attachment to the slit located near the other end of the plate of the pad member.

The advantages and novel features of the present invention will become more apparent by reference to the following detailed description in connection with the appended drawings illustrating preferred embodiments thereof.

BRIEF DESCRIPTION OF THE DRAWING

The preferred embodiments of the invention are illustrated in the accompanying drawings forming part of the detailed description and in which:

FIG. 3 is a bottom plan view of a stabilizer pad member and a first embodiment of the attachment of the present invention;

FIG. 4 is an end elevational view of the stabilizer pad member and attachment of FIG. 3;

FIG. 5 is a side elevational view of the stabilizer pad member and attachment of FIG. 3;

FIG. 6 is a bottom plan view of the stabilizer pad member and a second embodiment of the attachment of the present invention;

FIG. 7 is an end elevational view of the stabilizer pad member and attachment of FIG. 6; and FIG. 8 is a side elevational view of the stabilizer pad member and attachment of FIG. 6.

DESCRIPTION OF THE PREFERRED EMBODIMENTS

Figure 1:
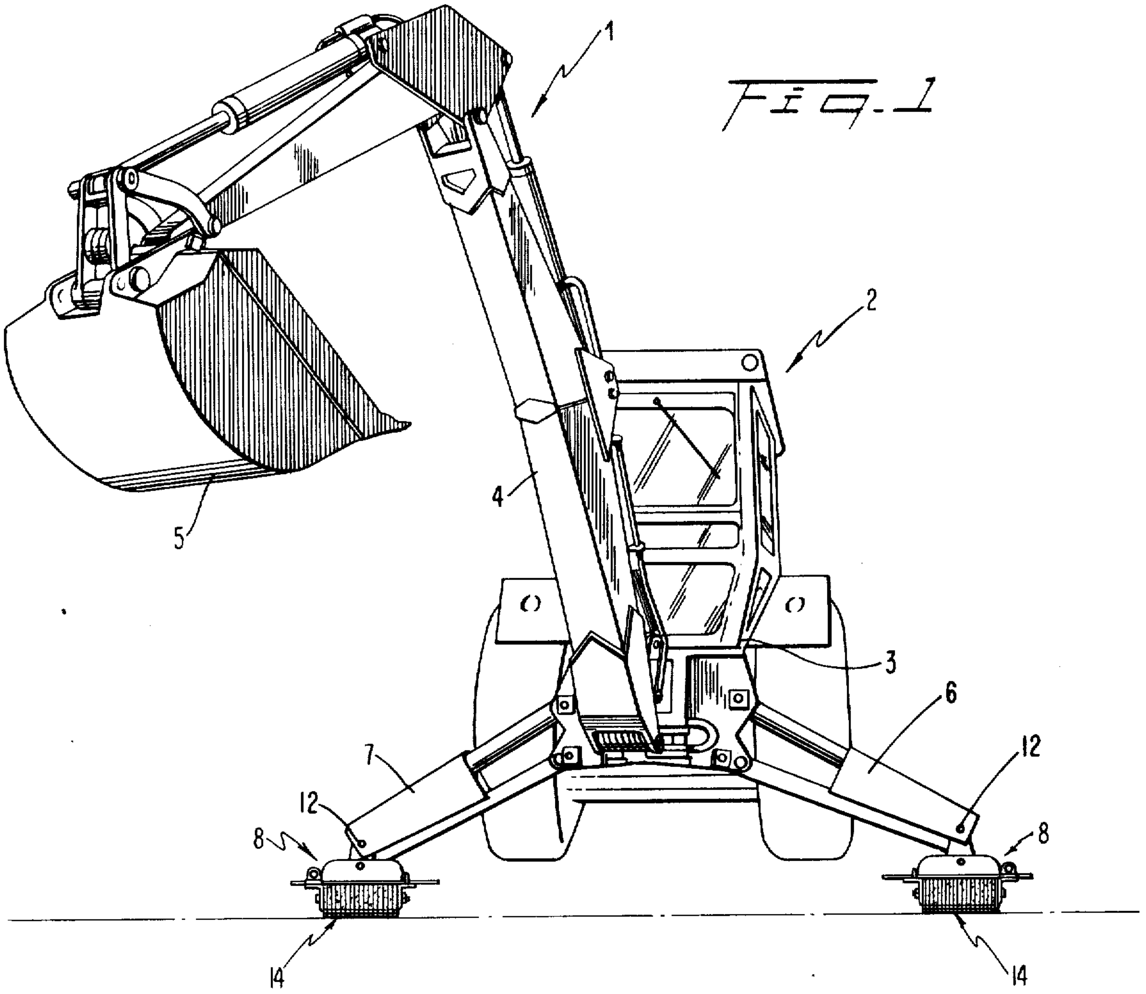
FIG. 1 is a perspective illustration of an earth-moving equipment, including a tractor vehicle and a backhoe attached thereto, provided with stabilizer arms and pad members having the attachments of the present invention.
Figure 2:
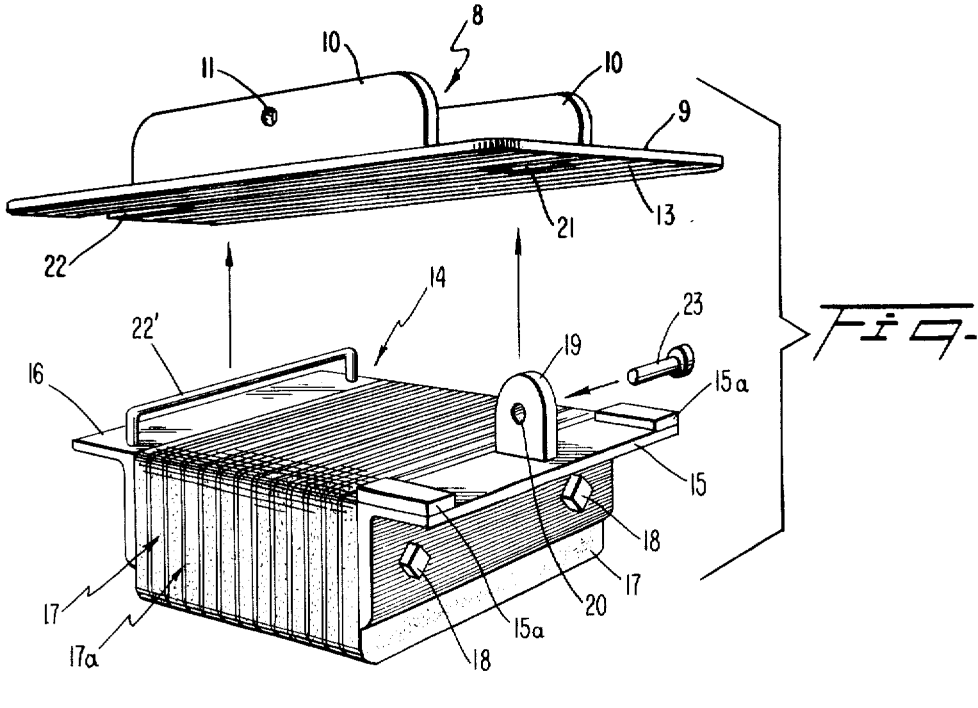
FIG. 2 is a detailed explosive view in perspective of a stabilizer pad member and attachment of the present invention.

With reference to FIG. 1 of the drawings, an earth-moving machine, such as a backhoe, indicated generally as 1, is shown attached to a vehicle, such as a tractor 2. The earth-moving machine generally consists of a frame 3 forming part of the tractor on which a swinging frame assembly 4 having a load-handling device, such as a bucket 5, is mounted for swinging movement about a horizontal as well as about a vertical axis.

A pair of stabilizing arm assemblies 6 and 7, respectively, are pivotally attached to the side of the machine frame 3 for stabilizing the machine on the ground when the machine is in a working position. Normally, the stabilizer arm assemblies 6 and 7 extend from the lateral sides of the frame 3 adjacent to the pair of wheels of the tractor vehicle 2 in a direction substantially normal to the longitudinal center line of the vehicle 2, and protrude outwardly to a point beyond the dimension of the wheel base of the tractor vehicle 2. Each of the stabilizer arm assemblies 6 and 7 is identical in construction, and, therefore, the features of the present invention will be described in connection with only one stabilizer arm assembly, it being understood that the same novel features and constructional details apply likewise to the other stabilizer arm assembly at the other side of the vehicle or machine. The stabilizer arm assemblies 6 and 7 have at their free ends stabilizer pad members 8 which are pivotally mounted at the free ends of the stabilizer arms 6 and 7.

Referring now to FIGS. 2–5 of the drawing, there is illustrated a stabilizer pad member 8 which comprises a ground-engaging plate 9 to which there are rigidly secured a pair of brackets 10, said brackets either being integral with the plate 9 or being welded thereto. Each bracket 10 of the pair of brackets has a hole 11, said holes 11 being aligned so that a pin 12 can be inserted therethrough, said pin being part of the pivotal connection between the stabilizer arm assemblies 6 and 7 and the stabilizer pad members 8.

As can be clearly noted from FIGS. 4 and 5, the pair of brackets 10 are normal with respect to the plate 9. Therefore, pins 12 can be easily inserted through the holes 11 and corresponding holes at the free ends of the stabilizer arm assemblies 6 and 7. The stabilizer pad members 8 can therefore be dismounted from the stabilizer arm assembly 6 and 7 by moving the pins 12.

The stabilizer pad member 8 has a substantially smooth bottom surface 13 which is adapted to contact a relatively smooth terrain and thus stabilize the earth-moving machinery on this smooth terrain when it is in operation. Frequently the stabilizer pad members 8 must contact a soft terrain. In such cases it is necessary to provide the stabilizer pad with a rubber-faced engaging surface. For this purpose, the present invention includes an attachment 14 which includes a pair of angle members 15 and 16 between which a plurality of rubber sheet plates 17 are disposed. The sheet plates 17 may be separated by metal plates 17*a*. A pair of bolts 18 and nuts 18*a* extend through aligned openings (not illustrated) through the angles 15, plates 17*a*, rubber plates 17 and angles 16 and serve to hold the assembly together. The bolts and nuts 18, 18*a* are threadably connected to each other so that the entire assembly may be tightened or loosened at will. The angle 15 has a central projecting portion 19 in which there is located a bore 20. The angle 16 has a U-shaped bar 22′ welded thereto by having the legs of the U-shaped bar extend through openings in the angle 16 and welding the protruding ends of the legs of the U-shaped bar 22 to the underside of the horizontally extending leg of the angle 16.

The plate 9 is provided with an elongated slit 21. The length and width of the elongated slit 21 are slightly larger than the corresponding length and width of the projecting portion 19 so that this projecting portion 19 of the angle 15 can be easily inserted through the opening 21. The area defined by the U-shaped bar 22′ and the horizontal leg of the angle 16 is slightly larger than the cross-sectional area of the plate 9 so that the latter can be easily slid into the space defined by the U-shaped bar 22′ and the horizontal leg of the angle 16. After the attachment 14 has been correctly positioned relative to the stabilizer pad member 8, a pin 23 is inserted through the hole 19 and maintains the attachment 14 in an operative position on the stabilizer pad member 8. The angle 15 is provided with a pair of supporting lips 15*a* which are preferably welded on the upper side of the horizontal leg of the angle 15 and serve to maintain the entire attachment 14 in a stable correct position on the pad member 8.

Referring now to FIGS. 6–8 there is illustrated therein a second embodiment of the attachment forming part of this invention. This embodiment is adapted to be mounted on pad members 8 which form part of larger earth-moving machinery. All of those members which are equivalent to the members of the first embodiment of the invention will be referred to with the same reference numerals but with the suffix prime (′) added thereto. It can be noted that in FIG. 6 there is shown the plate 9′ having a pair of brackets 10′ welded thereto and having an elongated slit 21′ adjacent to which there are welded to the plate 9′ a pair of supporting lips 24′. A bar 22′ surrounds the horizontal leg of the angle 16′ so that the free ends of the bar 22″ can be welded to the underside of the horizontal leg of the angle 16′ as shown in FIGS. 7 and 8. Bolts and nuts 18′ serve to retain between the angles 16′ and 15′ a plurality of rubber sheets 17′ and metal sheets 17*a*′.

After the attachment 14, 14′ has been correctly positioned on the stabilizer pad member 8, 8′, the rubber sheets 17, 17′ firmly engage a soft terrain, such as for example an asphalt-covered surface without substantially deforming the same and stabilize the earth-moving machinery 2 on such asphalt-covered surface.

Although the invention is illustrated and described with reference to a plurality of preferred embodiments thereof, it is to be expressly understood that it is in no way limited to the disclosure of such preferred embodiments, but is capable of numerous modifications within the scope of the appended claims.

What is claimed is:

1. An attachment for ground engaging pads of stabilizer arms of a material-handling apparatus, comprising in combination, a ground-engaging plate having a preselected cross sectional area and an opening, said ground-engaging plate has a pair of brackets projecting therefrom and being adapted to be pivotally connected to the free end of a stabilizer arm, said pair of brackets has a pair of aligned holes adapted to receive a first pin which forms part of the pivotal connection between the free end of the stabilizer arm and the ground-engaging plate, an attachment having at least a pair of supporting members, a pair of angles, a plurality of parallel rubber plates disposed between said supporting members, bolt means holding said supporting members and rubber plates together, a projecting portion adapted to extend through said opening when said attachment is assembled with said ground-engaging plate, and having an elongated inverted U-shaped bar the ends of which are secured to one of said supporting members of said attachment, said bar is secured to one supporting member and said projecting portion secured to another supporting member, the area between said elongated bar and said attachment being slightly larger than the cross-sectional area of said ground-engaging plate so that said plate can be disposed therebetween when said attachment is assembled with said ground-engaging plate, and retaining means adapted to be operatively and removably mounted on said projecting portion for maintaining said attachment in operative position on said plate, the ground-engaging characteristics of the ground-engaging pad being substantially different when said attachment is operatively mounted thereon.

2. The attachment for ground-engaging pads of stabilizer arms of material-handling apparatus as set forth in claim 1, and including a pair of lip members on said other supporting member extending along opposite sides of said opening, said retaining means including a second pin which is adapted to be supported on said pair of lip members and serves to maintain an assembly of said ground-engaging plate and said attachment.

* * * * *